(12) United States Patent
Hasegawa

(10) Patent No.: US 7,034,809 B2
(45) Date of Patent: Apr. 25, 2006

(54) COORDINATE INPUT APPARATUS

(75) Inventor: Masahide Hasegawa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 384 days.

(21) Appl. No.: 10/093,452

(22) Filed: Mar. 11, 2002

(65) Prior Publication Data
US 2002/0163508 A1 Nov. 7, 2002

(30) Foreign Application Priority Data
Mar. 13, 2001 (JP) ............... 2001-071130

(51) Int. Cl.
G09G 5/00 (2006.01)

(52) U.S. Cl. .................. 345/173; 345/175; 178/18.01; 178/18.03

(58) Field of Classification Search ............. 345/173, 345/175, 177–179; 178/18.01, 18.03, 18.04, 178/19.01, 19.03
See application file for complete search history.

(56) References Cited
U.S. PATENT DOCUMENTS

| | | | |
|---|---|---|---|
| 5,499,098 A | 3/1996 | Ogawa | ............... 356/375 |
| 5,502,568 A | 3/1996 | Ogawa et al. | ............... 356/375 |
| 5,838,097 A | 11/1998 | Kasanuki et al. | ............... 313/495 |
| 6,208,330 B1 * | 3/2001 | Hasegawa et al. | ............... 345/173 |
| 6,352,351 B1 * | 3/2002 | Ogasahara et al. | ............... 362/31 |
| 6,421,042 B1 * | 7/2002 | Omura et al. | ............... 345/157 |
| 6,492,633 B2 * | 12/2002 | Nakazawa et al. | ............... 250/221 |
| 6,563,491 B1 * | 5/2003 | Omura | ............... 345/173 |

FOREIGN PATENT DOCUMENTS

| | | |
|---|---|---|
| JP | 5-134803 | 6/1993 |
| JP | 6-274266 | 9/1994 |

* cited by examiner

Primary Examiner—Alexander Eisen
Assistant Examiner—Kimnhung Nguyen
(74) Attorney, Agent, or Firm—Fitzpatrick, Cella, Harper & Scinto

(57) ABSTRACT

A coordinate input apparatus has a generally rectangular, flat coordinate input area and a set of at least first and second detectors for detecting arrival/non-arrival of light from an object to be detected present at any position in the coordinate input area. Coordinates indicating the position are output on the basis of outputs from the first and second detectors. The first and second detectors are placed at positions where coordinate resolution in the vicinity of a point, within the coordinate input area, nearest to the midpoint of a line segment connecting fiducial points of the two detectors is substantially equal to coordinate resolution in the vicinity of a point, within the coordinate input area, farthest from the midpoint.

9 Claims, 14 Drawing Sheets

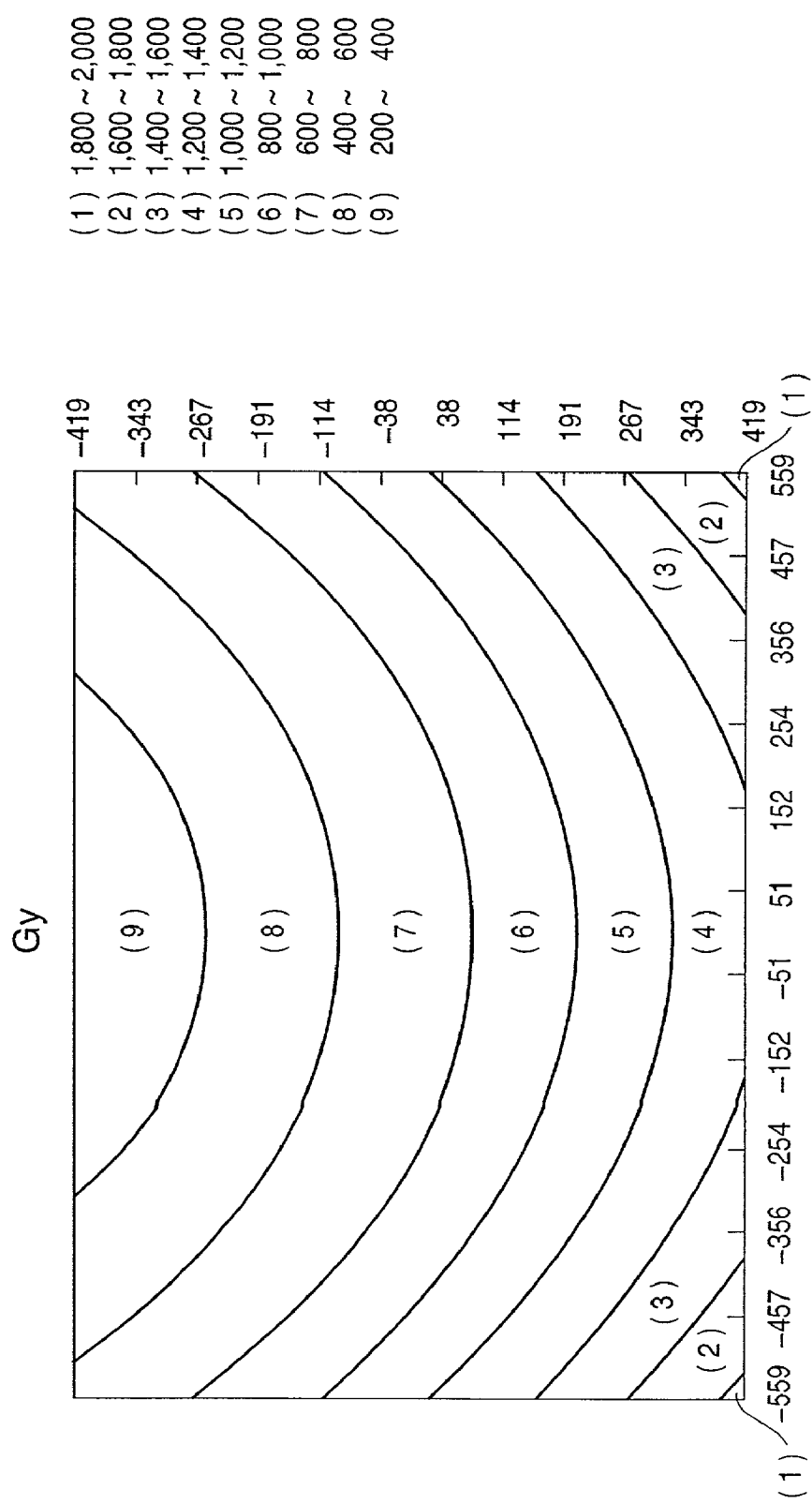

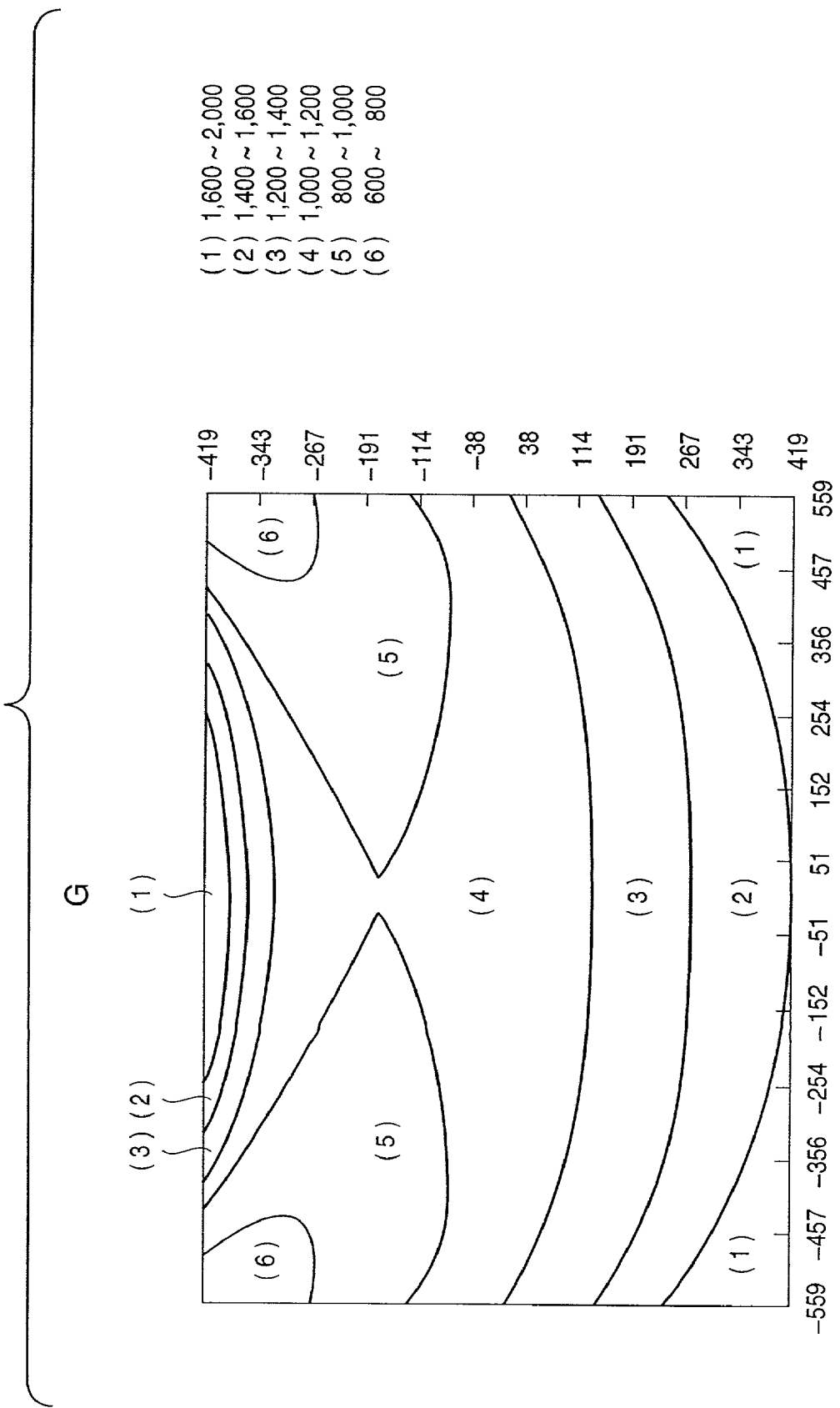

2A''

COORDINATE INPUT APPARATUS

FIELD OF THE INVENTION

This invention relates to a coordinate input apparatus for outputting coordinates of a designated position.

BACKGROUND OF THE INVENTION

In a coordinate input apparatus according to the prior art, coordinates are entered by being designated on a flat input surface using a designating tool or a finger, whereby the apparatus can be used to control a connected computer or to write characters and graphics, etc. In an example of a coordinate input apparatus of this type, the direction along which light arrives from a designating tool is detected by a set of two angle detectors placed at both ends of the upper side of the input surface, and the position of the designating tool is detected by the triangulation principle. An angle sensor in practical use scans the input surface using a laser scanner and detects reflected light from the designating tool. Further, the specifications of Japanese Patent Application Laid-Open Nos. 5-134803 and 6-274266 propose a method of measuring the position of a light-emitting source, which is provided on a designating tool, using a linear sensor.

In recent years, improvements in the brightness of large display screens have been made and these displays are now fully satisfactory for use in brightly lit environments. In addition, use of computers has become widespread. For these reasons, there is growing demand for large-size computer displays for use in conference rooms and the like. In the case of presentations and conferences using such computer screens, a coordinate input apparatus that is capable of directly operating the screen is extremely convenient.

In particular, providing the angle detectors at both ends of the upper side of the input surface, as in the coordinate input apparatus of the prior art described above, is advantageous in that the input surface need only be a plane and can be made large without a large increase in cost.

However, with the method of obtaining coordinates by triangulation using angle detectors, detection precision varies depending upon the position on the input surface. This means that the resolution of the angle detectors must be made considerably higher than that of the input coordinates, or that the detectors be spaced away from the input zone to narrow the angular range within which the detectors are used. As a consequence, the cost of the detectors rises and the arithmetic circuitry for calculating coordinates is of high speed and precision, is costly and consumes a large amount of power. The overall size of the apparatus that includes these detectors may increase significantly.

SUMMARY OF THE INVENTION

Accordingly, an object of the present invention is to provide an inexpensive, highly precise and small-size coordinate input apparatus.

According to the present invention, the foregoing object is attained by providing a coordinate input apparatus for outputting coordinates of a designated position, comprising a generally rectangular, flat coordinate input area, a set of at least two detectors for detecting arrival/non-arrival of light from an object to be detected present at any position in the coordinate input area, and coordinate calculation means for outputting coordinates indicative of the position based upon outputs from the two detectors, wherein the two detectors of the set are placed at positions where coordinate resolution in the vicinity of a point, within the coordinate input area, nearest to the midpoint of a line segment connecting fiducial points of the two detectors is substantially equal to coordinate resolution in the vicinity of a point, within the coordinate input area, farthest from the midpoint.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 6B is a diagram illustrating a distribution of values of sensitivity according to the first embodiment;

FIG. 6C is a diagram illustrating a distribution of values of sensitivity according to the first embodiment;

DESCRIPTION OF THE PREFERRED EMBODIMENTS

Embodiments of the present invention will now be described in detail with reference to the drawings.

<<First Embodiment>>

Figure 1:
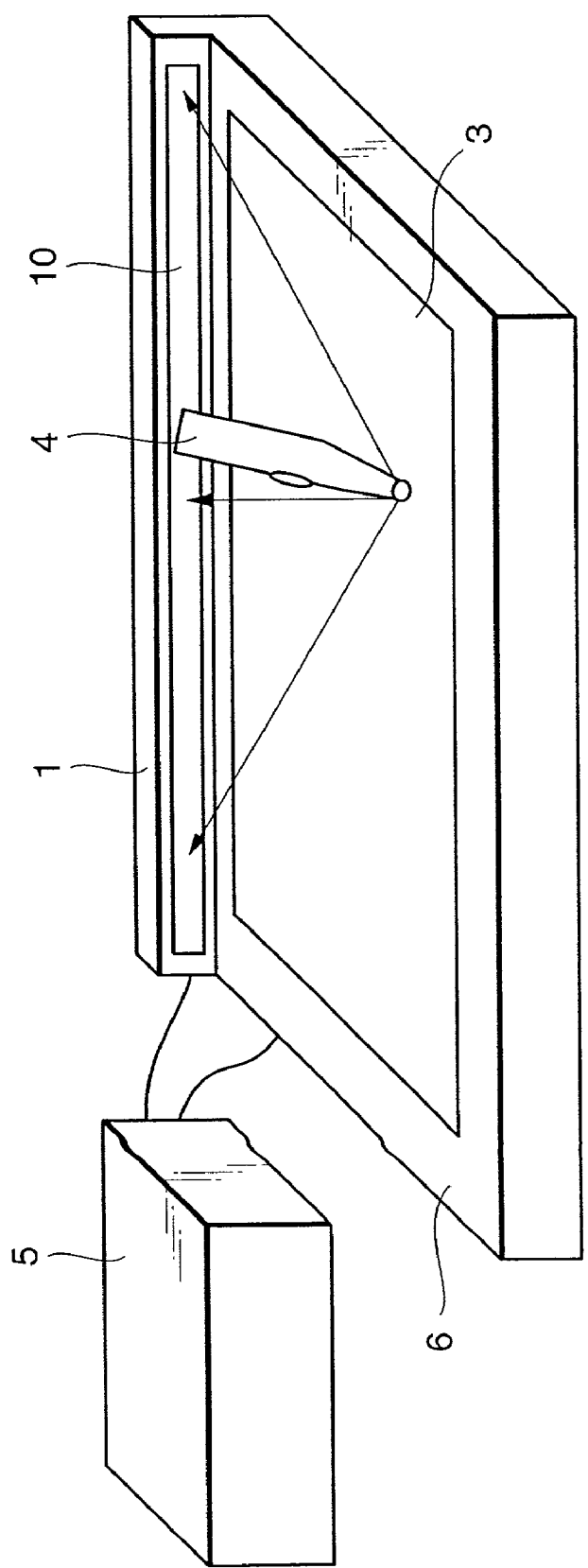
FIG. 1 is a perspective view schematically illustrating a coordinate input apparatus according to a first embodiment of the present invention.

FIG. 1 is a perspective view schematically illustrating a coordinate input apparatus according to a first embodiment of the present invention.

Broadly speaking, the coordinate input apparatus according to this embodiment comprises a designating tool 4 the tip of which is provided with a light-emitting portion for generating diffused light, and a coordinate detection unit 1 for detecting coordinates of the position of the light-emitting portion of the designating tool 4 in response to operation of the designating tool 4 within a coordinate input zone 3, which is a rectangular plane.

Also shown in FIG. 1 are a computer 5 connected to the coordinate detection unit 1 and, as an output device, a flat-panel display unit 6 for displaying images or the above-mentioned position information, etc., using the coordinate input zone 3 as a display area.

The computer 5 is a general-purpose computer having a CPU, a RAM, a ROM, a hard disk, an external storage device, a network interface, a display, a keyboard and a mouse, etc. Besides the computer, the connected device can be any that generates image information, such as a broadcast receiver, video tape recorder or GPS device, and it will suffice if the control circuits within these other devices implement functions similar to those of the computer. Further, it goes without saying that if the display unit 6 is one that displays images, the present invention will be applicable even if the unit is any display device such as a CRT monitor or projector, etc., and not a flat-panel device such as a liquid crystal monitor or plasma display. Since the coordinate input zone 3 is flat, it is desired that the display surface be flat, though the invention is applicable even if the display surface is curved to some extent.

The coordinate detection unit 1 includes two angle detectors 2A, 2B (described later with reference to FIG. 3), and a controller 11 (described later with reference to FIG. 3) for controlling the angle detectors and calculating XY coordinates from angle detection signals output from the detectors. The coordinate detection unit 1 detects coordinate information, which indicates the coordinates of the position of the designating tool 4 on the coordinate input zone 3, and control signals corresponding to the states of switches of the designating tool 4, and transmits this information from the controller 11 to the computer 5. Light from the designating tool 4 enters from a window 10. The latter is made of an infrared-transparent material to prevent the effects of extraneous light.

On the basis of the position information and control signals received, the computer 5 executes information processing, generates a display image signal and sends this signal to the flat-panel display unit 6, whereby an image is displayed.

By virtue of this arrangement, character information or line-drawing information is entered on the coordinate input zone 3 using the designating tool 4 and the information is displayed by the flat-panel display unit 6. This makes it possible to input and output information just as if a pencil and paper were used. In addition, an input operation such operation of buttons or selection and deciding of icons can be performed freely.

It should be noted that the present invention does not necessarily require that the display area and coordinate input zone be used in superimposed form. The display area and coordinate input zone may be disposed separately of each other.

<Detailed Description of Designating Tool 4>

Figure 2:
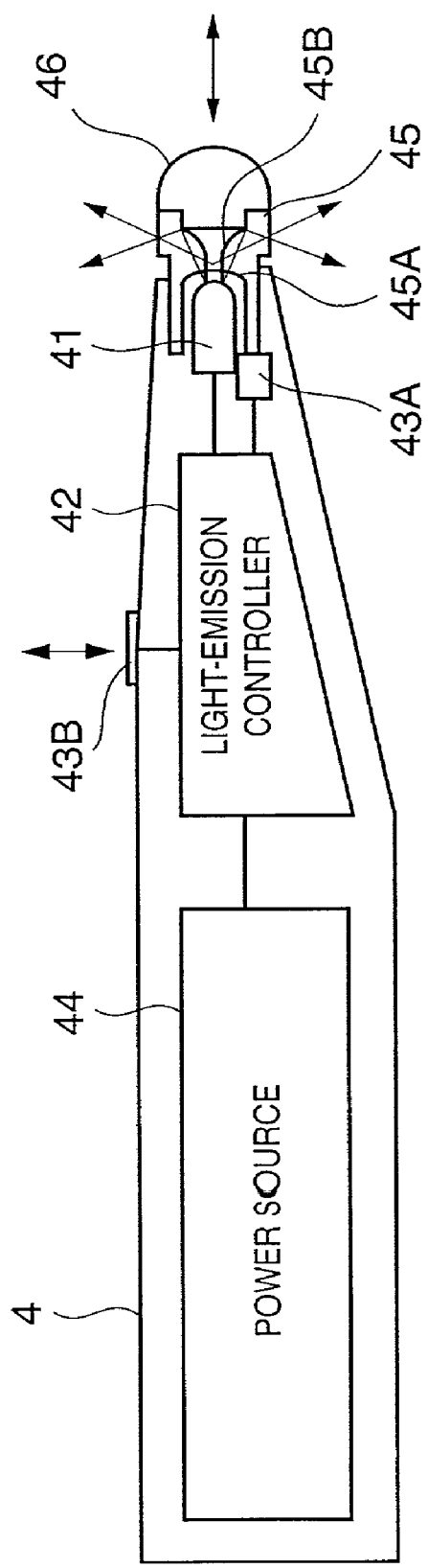
FIG. 2 is a diagram schematically illustrating the structure a designating tool according to the first embodiment.

FIG. 2 is a diagram schematically illustrating the structure of the designating tool 4 according to the first embodiment.

The designating tool 4 incorporates a light-emitting element 41 such as an LED for emitting infrared light, a light-emission controller 42 for driving and controlling the light emission, a power source 44 such as a battery, and two operating switches 43A, 43B. The light-emission controller 42 generates a drive signal, which is modulated in accordance with the states of the operating switches 43A, 43B, thereby driving the light-emitting element 41 so that light is emitted outwardly over an angle of 360° in directions perpendicular to the longitudinal direction of the tool.

The light emission is turned on and off by a power switch (not shown). This may be performed by another method, such as by controlling the light emission by a change in the states of the switches 43A, 43B or by so arranging it that light is emitted only when the power switch is being pressed.

The operator holds the designating tool 4 and points its tip toward the coordinate input zone 3. The switch 43B is so positioned that it will naturally be contacted by the operator's finger at this time. The switch 43A, on the other hand, is operated by pressing it against the input panel.

The designating tool 4 has a tip 46 made of a material with good slidability and little hardness so that the input panel will not be scratched. It is preferred that the material be a textile product such as pressed felt or a self-lubricating resin such as PTFE, POM or PA. However, a common resin such as ABS or PMMA will suffice, or an appropriate material may be selected taking into consideration compatibility with the input surface. The tip 46 is fixedly bonded to a transparent cap 45.

The transparent cap 45 is made of a transparent resin. The transparent cap 45 is so adapted that light from the light-emitting element 41 such as an LED will be diffused by an incidence surface 45A and reflecting surface 45B at an angle of ±30° with respect to a plane perpendicular to the longitudinal direction of the designating tool 4 and uniformly over the full circumference of 360° in the circumferential direction. As a result, even if the designating tool 4 is inclined somewhat at the time of operation, the emitted light will impinge reliably on the coordinate detection unit 1 and the power for driving the light-emitting element 41 can be conserved.

The incidence surface 45A is a refracting surface having a power that is slightly negative. By causing the light from the light-emitting element 41 to spread, the incidence surface 45A widens the range of allowable coaxial precision of the light-emitting element 41 and transparent cap 45. The reflecting surface 45B is generally conical in shape and has its ridgeline slightly curved (to approximate a parabola) so as to obtain an appropriate diffusion characteristic in the longitudinal direction of the designating tool 4. Further, the angle of incidence is engineered so as to produce total reflection. The incidence surface 45A may of course be coated with a reflecting material (aluminum or the like) by vapor deposition or plating. If full reflection is used, however, costs can be lowered and optimum reflectivity can be achieved.

When the power source is turned on, emission of light starts and a signal representing coordinates begins to be output from the coordinate detection unit 1 in accordance with predetermined processing. Under these circumstances, however, the switches 43A, 43B are in the OFF state. As a result, a designated position is merely indicated to the operator as by motion of a cursor or by a change in the highlighted condition of a button in the coordinate input zone 3.

Next, in response to pressing of the switches 43A, 43B, the light-emission controller 42 modulates the drive signal, which is detected by the coordinate detection unit 1. More specifically, when the designating tool 4 is pressed down on the panel, the switch 43A is turned on, thereby making it possible to start the entry of characters and line drawings and to control the screen as by selecting buttons. Further, other functions such as the calling up of menus can be implemented by pressing the switch 43B. As a result, the operator can write characters and drawings quickly and accurately and select buttons and menus all by a single hand. The apparatus therefore is very easy to operate.

Various methods can be used to achieve the modulation mentioned above. Even a method generally adopted by infrared remote controllers or the like can be applied satisfactorily. Further, it goes without saying that the number of switches may be increased or several designating tools may be provided and each may be assigned its own ID number or attribute information, thereby making it possible to implement other functions as well. For example, the color and thickness of lines may be changed and the designating tool can be switched over to act as an eraser.

<Detailed Description of Coordinate Detection Unit 1>

Figure 3:
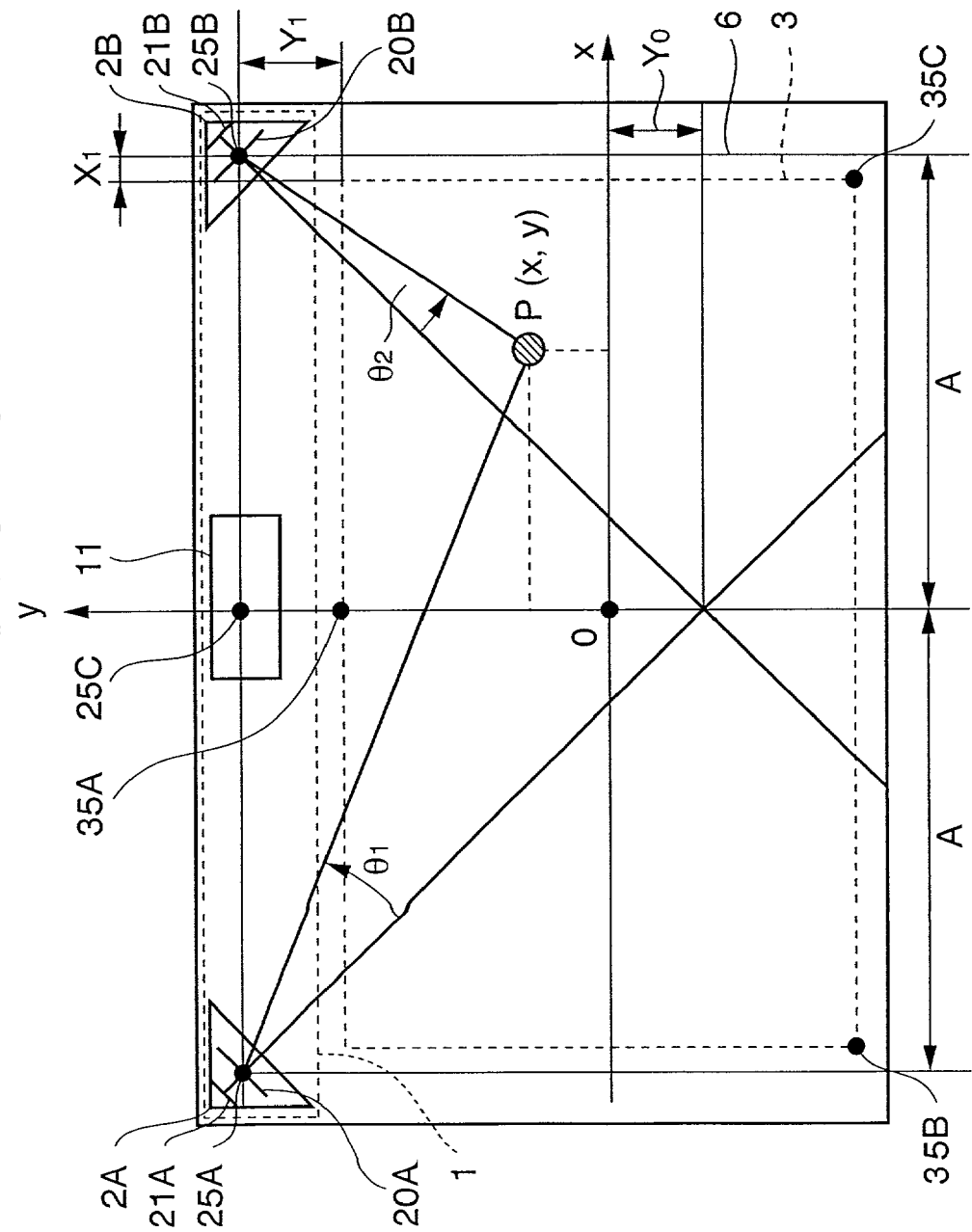
FIG. 3 is a diagram showing the internal structure of a coordinate detection unit according to the first embodiment.

FIG. 3 is a diagram illustrating the internal structure of the coordinate detection unit according to the first embodiment.

FIG. 3 illustrates a state in which a cover member has been removed so that the interior of the unit can be seen.

The coordinate detection unit 1 is provided with the two angle detectors 2A, 2B and controller 11. The angle detectors 2A, 2B are placed so as to detect the tangents of angles $\theta_1$, $\theta_2$ respectively, in the counter-clockwise direction from reference axes that define angles of 45° with respect to the X axis in an XY coordinate system in which the center of the coordinate input zone 3 is adopted as the origin O (0,0) and (−A,B), (A,B) are adopted as fiducial points 25A, 25B, respectively.

The controller 11 is placed midway between the angle detectors 2A, 2B on the upper side of the unit so as not to interfere with the optical paths of the detectors. The controller 11 may be situated at any position where it will not interfere with the optical paths. In this embodiment, however, the controller 11 is disposed at a position in close proximity to the coordinate input zone 3, as illustrated, because the control-signal light-receiving elements that detect the states of the switches 43A, 43B are provided within the controller 11.

<Detailed Description of Angle Detectors>

Figure 4:
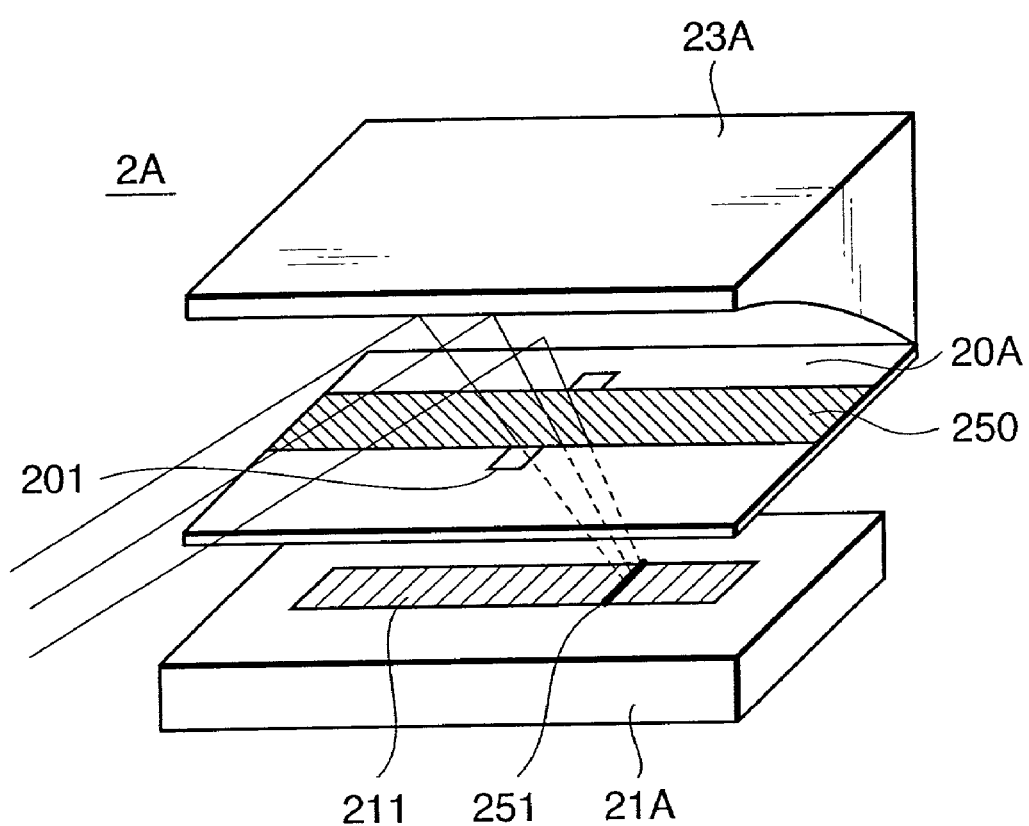
FIG. 4 is a perspective view illustrating an angle detector according to the first embodiment.
Figure 5:
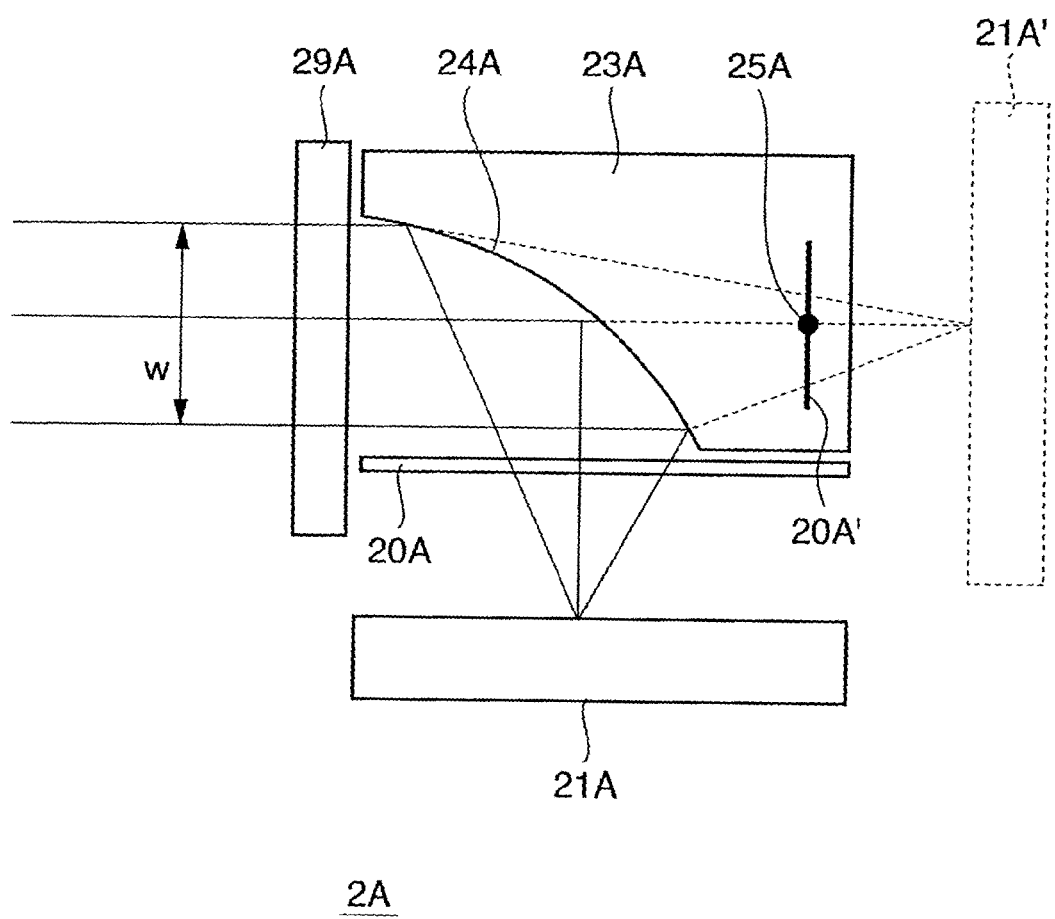
FIG. 5 is a side view of the angle detector according to the first embodiment.

FIGS. 4 and 5 are a perspective view and side view, respectively, of the angle detector 2A according to the first embodiment.

In FIGS. 4 and 5, a supporting member and light-shielding member have been removed so that the interior of the angle detector 2A can be seen. As the angle detector 2B has the same structure, only the structure of the angle detector 2A will be described.

The angle detector 2A comprises three main elements. Specifically, the angle detector 2A comprises a slit plate 20A consisting of a thin metal plate provided with a slit 201, a CCD linear sensor 21A in which a number of optoelectric transducers are arrayed in a straight line and can be read out successively, and a light-condensing mirror 23A having a mirror surface 24A the shape of which is parabolic when viewed from the side.

Light emitted when the designating tool 4 is in the vicinity of the input surface impinges upon the light-condensing mirror 23A in the form of pencils of light that are substantially parallel to the input surface. Since the mirror surface 24A is parabolic, these pencils of light are condensed at the focal point of the mirror and form a linear image. The CCD linear sensor 21A has a sensor portion 211 placed at the position of the focal point. As a result, parallel rays over a height W in the vicinity of input surface are caused to impinge effectively upon the sensor portion 211 so that a very high sensitivity is obtained. Since the sensor portion 211 actually has width, a satisfactory light condensing effect is obtained even if the sensor portion 211 deviates slightly from the position of the focal point.

Since the amount of light that arrives from the designating tool 4 when the tool is near differs greatly from the amount of light that arrives when the tool is far, the linear sensor 21A varies sensitivity as by a shutter operation to prevent saturation. By placing the linear sensor 21A at the focal point of the light-condensing mirror 23A, a state in which the focal point is adjusted to infinity is obtained. When the designating tool 4 is near, therefore, the light impinges on the sensor not as parallel flux but at an angle. As a consequence, the light is not condensed at the focal point. This has the effect of mitigating a change in the quantity of light. It goes without saying that it is preferred that the farthest point within the range of use be adjusted in such a manner that light will be condensed most effectively.

The slit plate 20A placed within the optical path has the length of the linear sensor 21A in the longitudinal direction of the sensor portion 211 and is provided at a distance where it can detect a necessary angle of view of a little less than 90°. In this embodiment, the sensor portion 211 has an overall length of 1.92 mm or 128 pixels, where one pixel has a width of 15 µm. The slit plate 20A is placed at a position that is 0.9 mm from the sensor portion 211. In this case an angle of view of 90° is a region of 0.9×2/0.015=120 pixels. In this embodiment the width of the slit 201 is 50 µm and the plate thickness is 10 µm. If the plate thickness were greater than the slit width, light from a direction of 45° would not pass through the slit. It goes without saying that the thinner the slit plate 20A, the better the characteristic in terms of the 45° direction left and right, though too small a thickness would result in a plate having inadequate rigidity. If plate thickness is 0.5 times the slit width or less, an aperture width of greater than 70% of the front side is assured. This may serve as a guideline.

It goes without saying that effects the same as those above may be obtained by using a thick plate and chamfering the plate at an angle of 45° or greater to reduce the only the thickness on both sides of the slit. However, the machining required to obtain this special shape is troublesome.

At the position of the slit plate 20A, entrant light cannot be condensed and an image 250 having a certain width is produced. Light that passes through the slit 201 forms an image 251 on the sensor portion 211. It will suffice if the length of the slit is somewhat greater than the width of the image 250. In the first embodiment, the length of the slit is 4 mm.

The image 251 is such that if the wavelength of infrared light is 0.8 µm, the Rayleigh distance will be 3.125 mm. The position at the distance of 0.9 mm is a Fresnel diffraction region. If the mirror surface 24A is an ideal mirror, therefore, the image obtained will be one having an overall width of about 50 µm and will possess fine light and dark fringes peculiar to Fresnel diffraction in the vicinity of both edges. In order to make the image a smooth image with a Rayleigh distance of less than 0.9 mm, it is required the width of the slit 201 be made less than 26.8 µm. However, the image obtained in this case has a width of less than 30 µm. In any case, if the image is detected by a sensor having a pixel pitch of 15 µm, the centroid position of this calculation will not vary smoothly and, hence, resolution cannot be improved by performing subdivision between pixels.

In this embodiment, therefore, the mirror surface 24A is finished to approximately Ra 0.2 so that the mirror surface 24A will exhibit some optical diffusion in the direction of slit width. Specifically, though appropriate optical diffusion can be obtained by buffing an aluminum material, a suitable machining method should be selected in accordance with the material and necessary roughness. Electrolytic polishing or lapping may be used. If roughness is large, sandpaper finishing or chemical polishing may be employed.

In a case where the mirror surface 24A exhibits optical diffusion, the mirror surface acts as an optical low-pass filter, the image spreads in accordance with the diffusion characteristic and both edges will exhibit a smooth slope. In the first embodiment, a smooth image where the half-value width of the image 251 is about 75 μm is obtained, with the quantity of light being approximately zero at a position of about 100 μm. The position of the centroid of this image faithfully reflects the direction in which the light arrives, and a smooth shape having a width that is seven times the pixel pitch is obtained. As a result, interpolation is performed between pixels by centroid calculation and a resolution higher than the number of pixels is obtained.

The output of the angle detector 2A thus obtained becomes a tangent of angle $\theta_1$, in which the position 25A of a virtual image 20A' of slit 201 is adopted as a fiducial point and a straight line at right angles to the longitudinal direction of a virtual image 21A' of sensor portion 211 in a plane parallel to the input surface is adopted as a reference line. Similarly, the output of the angle detector 2B becomes a tangent of angle $\theta_2$, in which point 25B is adopted as the fiducial point.

<Operation of Controller 11>

The controller 11 has a driving control unit for the two linear sensors 21A, 21B, a coordinate calculation unit for calculating coordinates, as will be described later, from the outputs of these sensors, control-signal light-receiving elements and signal detectors for detecting the states of the switches of designating tool 4, and a communication control unit for communicating coordinates and switch information to an externally connected device (e.g., the computer 5).

When light is emitted from the designating tool 4, the control signals are detected and the linear sensors 21A, 21B output signals corresponding to the tangents of angles $\theta_1$, $\theta_2$. Coordinates are calculated from these output signals and are communicated to the externally connected device (e.g., the computer 5) together with the states of the switches, whereby one series of operations is completed. The desired function is attained by repeating these operations.

<Coordinate Calculation Method>

In FIG. 3, an XY coordinate system having the center of the coordinate input zone 3 as its origin is defined. Let P(x,y) represent the position of the light-emitting element of designating tool 4, let 25A (−A,B), 25B (A,B) and 25C (0,B) represent fiducial points of the angle detectors 2A, 2B and the midpoint between them, and let 2×A, 2×B represent the width and height of the screen, respectively. Point P(u,v) satisfies the following:

$$\tan\theta_1 = -v/(\sqrt{2\times A}+u), \tan\theta_2 = -v/(\sqrt{2\times A}+v)$$

where the reference lines of the angle detectors are coordinate axes u, v.

Specifically, we have $$u=\sqrt{2\times A}\times\tan\theta_2\times(1-\tan\theta_1)/(1+\tan\theta_1\times\tan\theta_2)$$

$$v=-\sqrt{2\times A}\times\tan\theta_1\times(1-\tan\theta_2)/(1+\tan\theta_1\times\tan\theta_2)$$

Since $x=(u-v)/\sqrt{2}$, $y=-(u+v)/\sqrt{2}-Y_0$ holds, we have $$x = A \times (\tan\theta_1 + \tan\theta_2)/(1 + \tan\theta_1 \times \tan\theta_2)$$

$$y = A \times (\tan\theta_1 - \tan\theta_2 + 2 \times \tan\theta_1 \times \tan\theta_2)/(1 + \tan\theta_1 \times \tan\theta_2) - Y_0$$

If the detected $\tan\theta_1$, $\tan\theta_2$ are substituted into Equation (1), x, y can be calculated.

<Placement of Angle Detectors>

Sensitivity (resolution) indicating the effect of placement of the angle sensors 2A, 2B upon the calculated coordinates will now be described.

Sensitivity (Gx,Gy) with respect to position P (x,y) is calculated in accordance with the following using Equation (1):

$$Gx=\sqrt{\{[\partial x/\partial(\tan\theta_1)]^2+[\partial x/\partial(\tan\theta_2)]^2\}}$$

$$Gy=\sqrt{\{[\partial y/\partial(\tan\theta_1)]^2+[\partial y/\partial(\tan\theta_2)]^2\}} \quad (2)$$

Figure 6A:
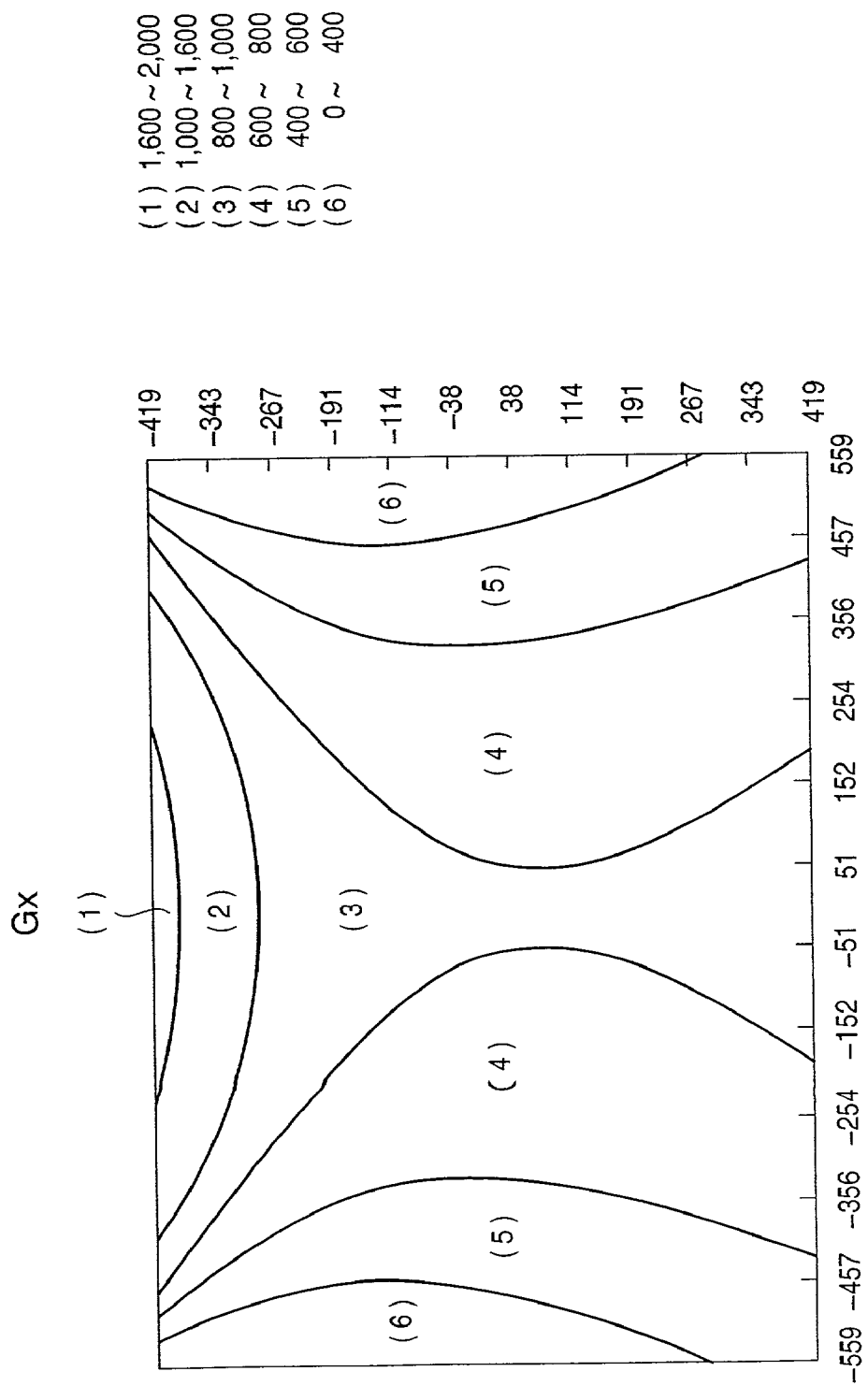
FIG. 6A is a diagram illustrating a distribution of values of sensitivity according to the first embodiment.

FIGS. 6A to 6C illustrate the results of calculating sensitivity (Gx,Gy) and combined sensitivity $G=\sqrt{(Gx^2+Gy^2)}$ in a case where the coordinate input zone 3 has a diagonal size of 55 in. and an aspect ratio of 4:3. The numerical value (maximum: 1800 to 2000) of each region, which is the combined sensitivity, is indicated in millimeter units. Accordingly, in a case where the combined sensitivity is 2000, a resolution of 1 mm will obtained if a 45° range is detected upon being divided into 2000 segments.

It will be understood from these results that maximum sensitivity will be obtained where the x coordinate is 35A, which is nearest to the midpoint 25C, and the y coordinates are 35B, 35C, which are farthest from the midpoint 25C.

As may readily be surmised from FIGS. 6A to 6C, the maximum value of Gx decreases suddenly and Gy increases gradually if an offset Y1 of the angle detectors 2A, 2B in the Y direction is enlarged.

More specifically, a Y1 for which the total sensitivity G is the same at points 35A, 35B and 35C exists. Accordingly, so selecting Y1 is the best course. In actuality, if the mounting positions include an error, the fact that sensitivity is greatest at point 35A means that it is preferred that Y1 be enlarged correspondingly to make allowance for this error.

The Figures illustrate a case where Y1 is made equal to 78 mm so as to establish the relation G(35A)≈G(35B). The maximum value of G in this case is 1930. That is, if use is made of a linear sensor in which an angle of view of 90° is 120 pixels, as mentioned above, then this will be equivalent to 1930 mm per 60 pixels, i.e., 32.2 mm per pixel, where G is largest. Accordingly, if the centroid of the sensor output waveform is calculated at a resolution of ⅟32 of a pixel, a resolution of amount 1 mm is obtained.

The larger an offset X1 of the angle detectors 2A, 2B in the X direction (i.e., the greater the distance between 2A and 2B) (in the first embodiment, left-right symmetry is assumed, though left-right asymmetry is possible), the sharper the increase in the maximum value of Gx and the more gradual the decrease in the maximum value of Gy. Accordingly, making X1 as small as possible is advantageous in reducing the size of the apparatus because this makes it possible to place the angle detectors 2A, 2B close to the input area with respect to the same maximum value of G.

However, if the angle detectors are made so close to the input area that X1 becomes a negative value, it will be necessary to enlarge the angle of view of the angle detectors 2A, 2B from a little less than 90° to a little less than 180° at a stroke. Though this is not impossible, it cannot be said to be a suitable expedient.

Thus, in accordance with the first embodiment, as described above, the angle detectors 2A, 2B are placed at positions, with respect to the generally rectangular coordinate input zone 3 of the coordinate input apparatus, where coordinate resolutions at points farthest from and nearest to the midpoint of the straight line connecting the fiducial points of the two angle detectors 2A, 2B become approximately equal. As a result, high-resolution coordinates can be obtained without raising the resolution of the angle detectors. Further, since the resolution of the angle detectors 2A, 2B can be utilized effectively, sensors of low cost can be used. In addition, the scale of the circuitry and power consumption can be reduced because the amount of processing needed to calculate coordinates is not increased. Accordingly, it is possible to realize a high-resolution, low-cost coordinate input apparatus. Since the angle detectors 2A, 2B are positioned close to the coordinate input zone 3, it is possible to realize a compact, light-weight and low-cost coordinate input apparatus.

<<Second Embodiment>>

Figure 7:
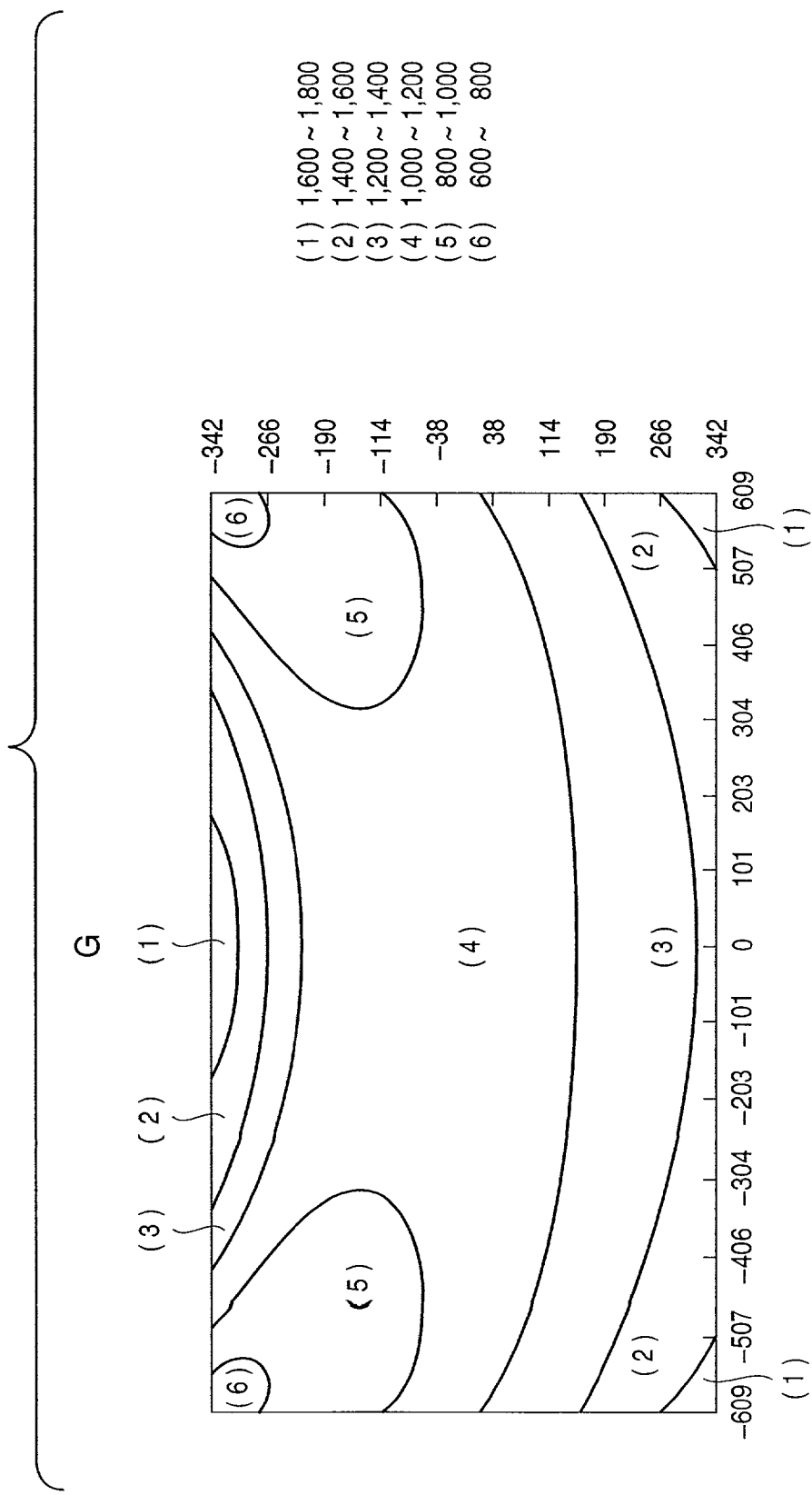
FIG. 7 is a diagram illustrating a distribution of values of sensitivity according to a second embodiment.
Figure 8:
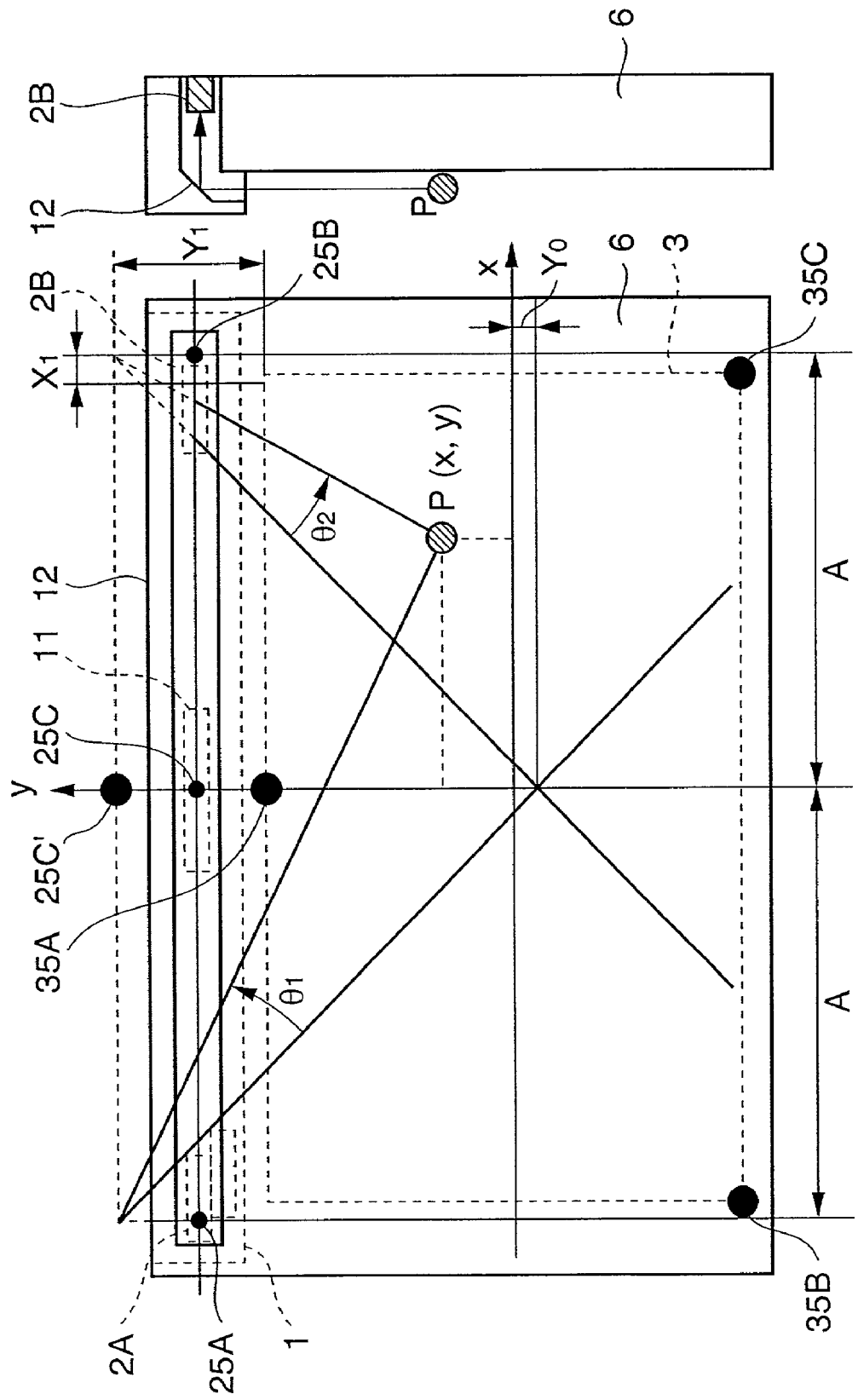
FIG. 8 is diagram illustrating the structure of angle detector according to the second embodiment.

FIG. 7 illustrates the results of calculating combined sensitivity G in a case where the coordinate input zone 3 has a diagonal size of 55 in. and an aspect ratio of 9:16. Here use is made of the same coordinate detection unit 1 described in the first embodiment. In this instance, the optimum value of Y1 is 113 mm, in which case G=about 1730 holds. If Y1 were to be made 78 mm, which is the value used in the first embodiment, without applying the present invention, G would worsen to about 2220. Thus, the effect of the present invention is obvious.

However, if Y1 is much larger than 113 mm, spacing the coordinate detection unit 1 away from the coordinate input zone 3 by this amount will result in a coordinate input apparatus of large size and will detract from the appearance of the apparatus. In the second embodiment, therefore, the optical path is bent at a right angle by a mirror 12 and the thickness of the flat-panel display unit 6 is utilized to reduce the external dimensions of the apparatus. More specifically, the mirror 12 is placed in the vicinity of one side of the coordinate input zone 3 on the side near the midpoint 25C of the line segment connecting the fiducial points 25A, 25B, and the angle detectors 2A, 2B are placed toward the rear or front of the input surface or on the back side thereof.

The angle of the mirror 12 and the number of reflections can be decided based upon the particular design. Further, the type of mirror used will differ depending upon the structure and thickness of the flat-panel display unit 6. In addition, a prism may be used instead of a mirror.

The second embodiment has effects in addition to the above-described effects of the first embodiment. According to the second embodiment, as described above, Y1 is set using a virtual image 25C' at the midpoint 25C of the line segment connecting the fiducial points 25A, 25B of the angle detectors 2A, 2B. In addition, the mirror 12 is used in the vicinity of one side of the coordinate input zone 3 on the side near the midpoint 25C, and the angle detectors 2A, 2B are placed toward the rear or front of the coordinate input apparatus or on the back side thereof. As a result, even if Y1 is large, the external dimensions of the coordinate input apparatus can be reduced without sacrificing performance.

<<Third Embodiment>>

Figure 9:
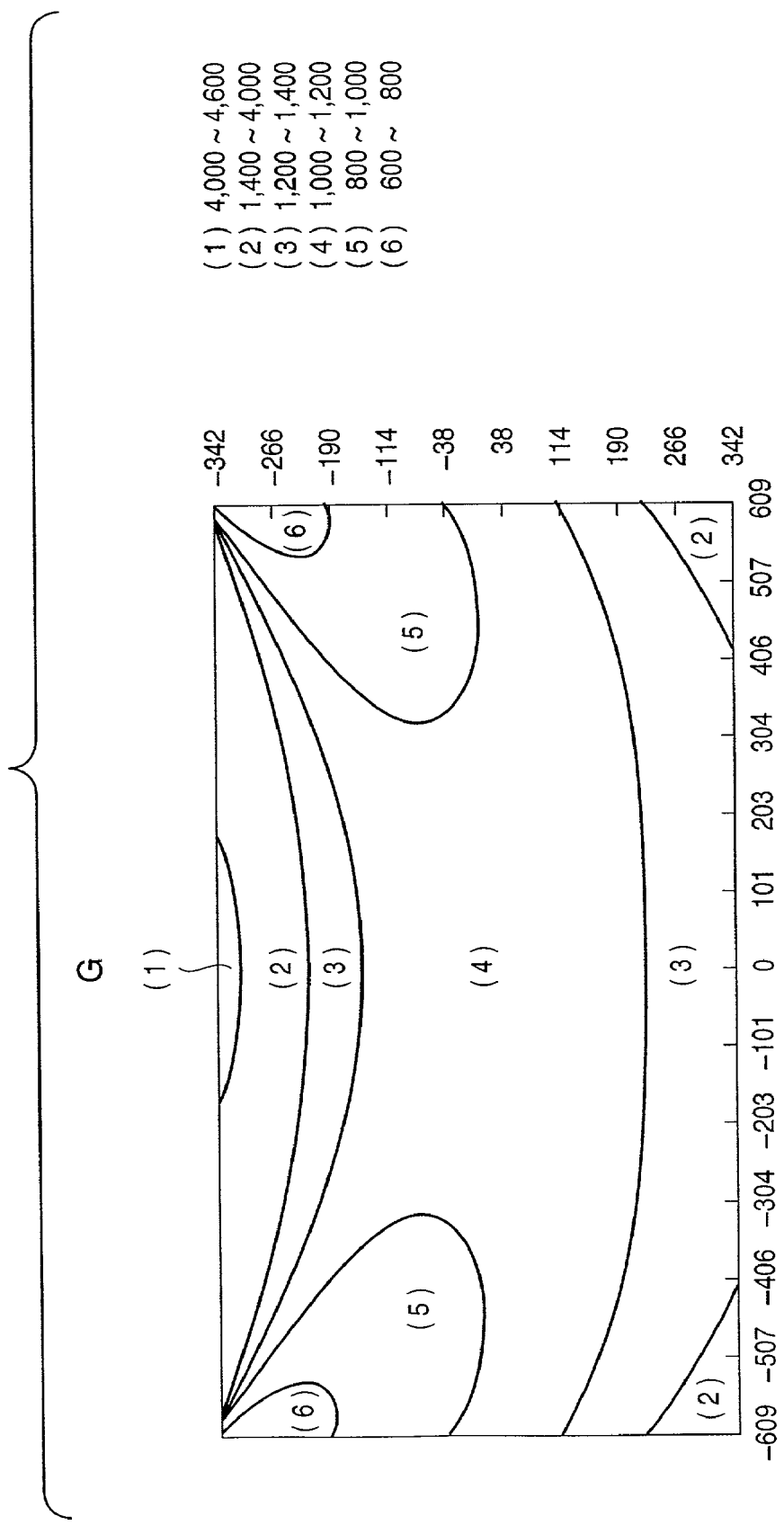
FIG. 9 is a diagram illustrating a distribution of values of sensitivity according to a third embodiment.

A third embodiment deals with a case where the coordinate input zone 3 has a diagonal size of 55 inches and an aspect ratio of 9:16 and Y1 is made 33 mm without using a mirror. In this case, the maximum value of total sensitivity G is 4560 at the central portion of the upper side, as depicted in FIG. 9. Further, the value is 1590, or approximately one-third of the above value, at both ends of the lower side. Thus, the third embodiment is so adapted that an angle detector 2A', which corresponds to the angle detector 2A, can detect an area in the proximity of the central, upper side at an angular resolution that is three times greater.

Figure 10:
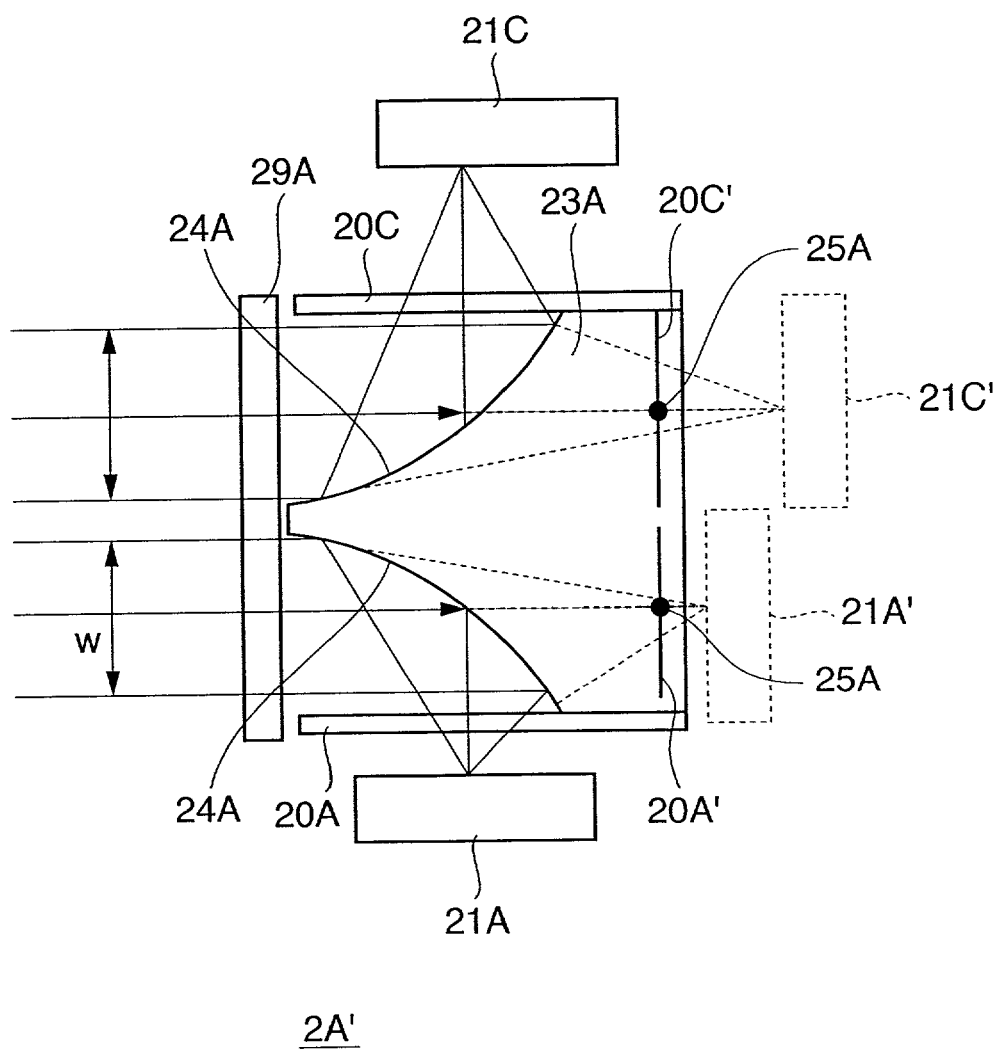
FIG. 10 is a side view illustrating the optical path of the angle detector according to the third embodiment.

FIG. 10 is a side view illustrating the optical path of the angle detector 2A' according to the third embodiment.

In a manner similar to the angle detector 2A described in the first embodiment, the angle detector 2A' of this embodiment is provided with the mirror 24A, slit 20A and linear sensor 21A for performing detection over an angular range of about 90° and, on the opposite side, a mirror 24C, slit 20C and linear sensor 21C for performing detection over an angular range of about 30°. The distance between the slit 20C and linear sensor 21C is made about three times the distance between the slit 20A and linear sensor 21A. As a result, detection is performed at approximately three times the angular resolution. Further, the range of detection is limited to the portion near the upper side.

A changeover between the two linear sensors 21A and 21C may be performed at a predetermined angle, or a changeover range of a fixed width (e.g., 2°) may be set and the changeover may be made smoothly at a weighted mean of angles found from the outputs of the two linear sensors 21A and 21C.

Further, virtual images of the slit 20C and linear sensor 21C are indicated at 20C' and 21C', respectively.

Furthermore, it goes without saying that another angle detector 2B' corresponding to the angle detector 2B is configured to have left-right symmetry with respect to the angle detector 2A'.

In accordance with the third embodiment, as described above, use is made of at least two types of angle detectors 2A', 2B' for detecting direction at a point nearest the midpoint 25C of the line segment connecting the fiducial points 25A, 25B at a resolution higher than that of another direction, and the two angular detectors 2A', 2B' are placed at positions where the coordinate resolutions at the central, upper side and at both ends of the lower side will be approximately equal. As a result, it is possible to make the value of Y1 a very small 33 mm, as mentioned above, so that the exterior dimensions of the apparatus can be reduced.

<<Fourth Embodiment>>

Figure 11:
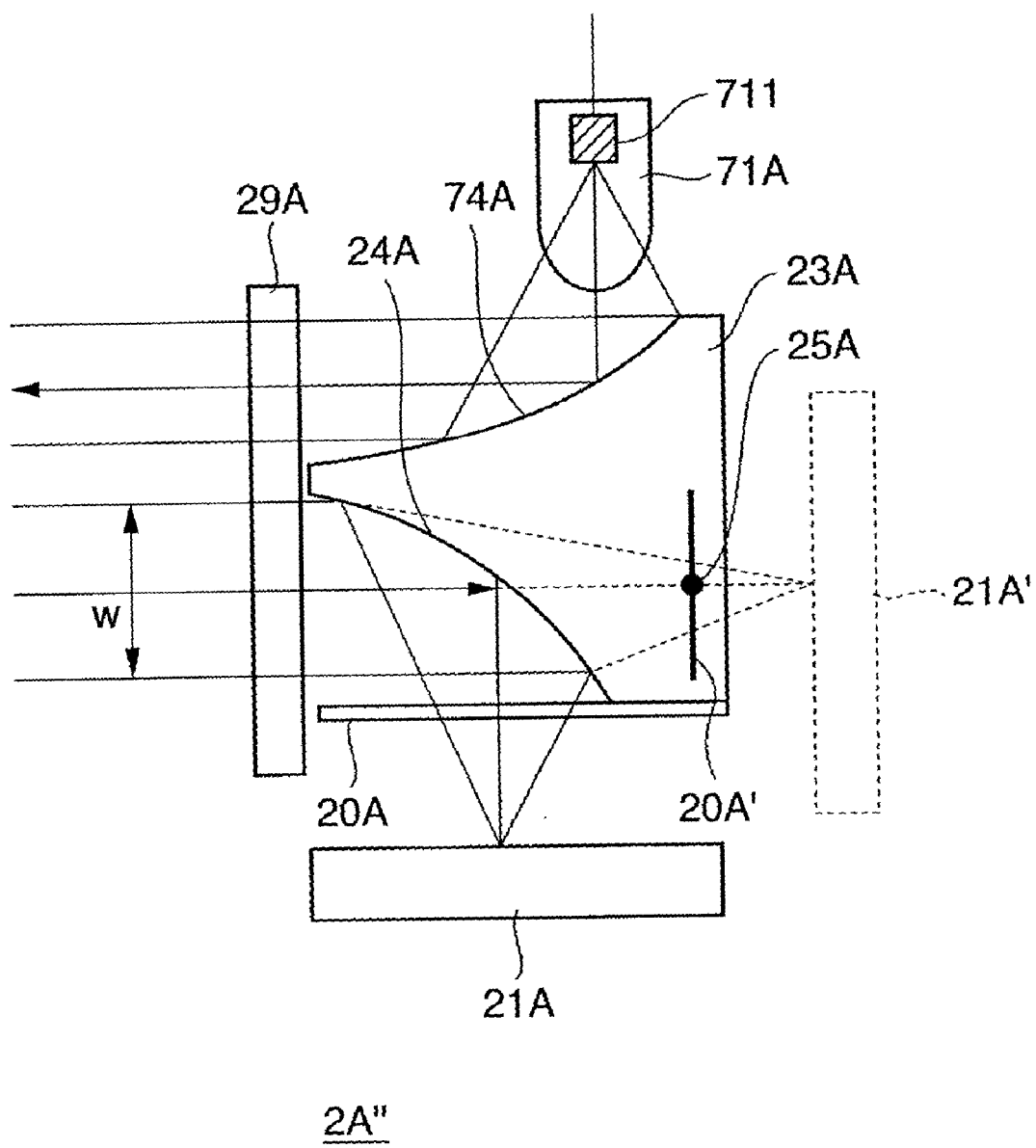
FIG. 11 is a side view illustrating an optical path in an example of an illuminating optical system according to a fourth embodiment.

In all of the embodiments described thus far, the designating tool 4 emits light and the direction along which the light arrives is detected. However, it may be so arranged that the direction along which reflected light arrives from the designating tool 4 is detected by adopting a set-up of the kind shown in FIG. 11. More specifically, a light-emitting member 71A such as an LED is provided in the vicinity of an angle detector 2A", which corresponds to the angle detector 2A, and light from a light-emitting portion 711 of the light-emitting member 71A irradiates a condensing mirror having a mirror surface 74A the shape of which is parabolic when viewed from the side. The mirror surface 74A has a parabolic shape so as to condense light in the direction of the designating tool 4, which is the direction of irradiation. Light that has been condensed on the designating tool 4 is reflected by a reflecting member 8 (see FIG. 12) provided in the designating tool 4, and the reflected light is detected by the angle detector 2A".

It goes without saying that an angle detector 2B" corresponding to the other angle detector 2B is configured to have left-right symmetry with respect to the angle detector 2A".

Figure 12:
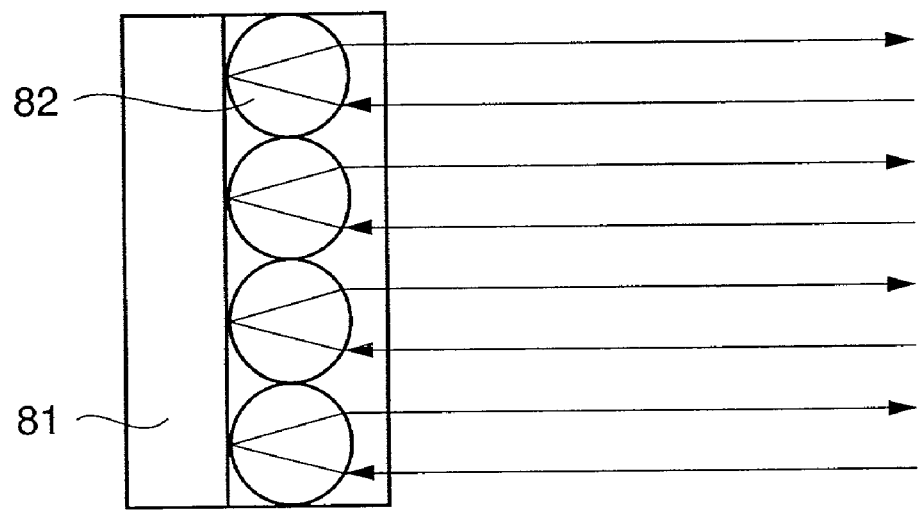
FIG. 12 is a sectional view illustrating a retroreflecting film according to the fourth embodiment.

Further, the reflecting member 8 provided on the designating tool 4 is a retroreflecting sheet, which returns light efficiently in the direction in which it came, available on the market. The sheet comprises a base film 81 and glass piece 82 having a high index of refraction, as shown in FIG. 12. This sheet is ideal for this application.

Furthermore, the present invention is applicable even in a case where the apparatus is adapted so that it can be used as a touch-sensitive panel, in which the reflecting member 8 is provided not in the designating tool 4 but on three sides of the coordinate input zone 3, for detecting a shadow that is produced when light that is blocked, diffused or absorbed not only by the designating tool 4 but also by an object such as the finger or hand of the operator.

Furthermore, a device other than one using a CCD may be adopted as the angle detector. For example, the present invention is applicable also to an apparatus in which a light beam is made to scan in a plane close and parallel to an input surface by a rotating reflection mirror, and an angle is detected at the timing of reflected light from a designating tool.

As many apparently widely different embodiments of the present invention can be made without departing from the spirit and scope thereof, it is to be understood that the invention is not limited to the specific embodiments thereof except as defined in the appended claims.

What is claimed is:

1. A coordinate input apparatus for outputting coordinates of a designated position, comprising:
   a generally rectangular, flat coordinate input area;
   a set of at least two detectors for detecting at least one of arrival of light and non-arrival of light from an object to be detected present at any position in said coordinate input area; and
   coordinate calculation means for outputting coordinates indicative of said position based upon outputs from said two detectors;
   wherein said two detectors of said set are placed at positions where a combined sensitivity in the vicinity of at least one of predetermined points, within said coordinate input area, nearest to the midpoint of a line segment connecting fiducial points of said two detectors is substantially equal to a combined sensitivity in the vicinity of at least one of predetermined points, within said coordinate input area, farthest from said midpoint, said combined sensitivities indicating the effect of placement of the two detectors upon calculated coordinates.

2. The apparatus according to claim 1, wherein optical-path converting means is placed in the vicinity of a side of said coordinate input area near said set of two detectors, and said set of two detectors is placed at a position where direction of the light is converted toward the rear, front or back side of an input surface of said coordinate input area.

3. The apparatus according to claim 1, wherein each detector of said set of two detectors has at least two types of angular resolution for detecting direction at a point nearest said midpoint at a resolution higher than that of other directions.

4. The apparatus according to claim 1, wherein the object to be detected is a designating tool having light-emitting means for emitting light.

5. The apparatus according to claim 1, wherein the object to be detected is a designating tool having reflecting means for reflecting light.

6. The apparatus according to claim 1, wherein the object to be detected blocks, diffuses or absorbs light.

7. The apparatus according to claim 1, wherein said set of two detectors is placed outside of said coordinate input area.

8. The apparatus according to claim 1, wherein said set of two detectors is placed so as to detect tangents of angles $\theta_1$, $\theta_2$ in the counter-clockwise direction from reference axes that define angles of 45° with respect to a line segment connecting the two detectors of said set of two detectors.

9. The apparatus according to claim 1, wherein said two detectors are placed to detect tangents of angles $\theta_1$, $\theta_2$ respectively, in a counter-clockwise direction from reference axes that define angles of 45° with respect to an X axis in an XY coordinate system, in which a center of the coordinate input area is adopted as an origin (0,0), and (−A,B), (A,B) and (0,B) are adopted as the fiducial points and a midpoint between them, and wherein a position P(x,y) represents one position in the coordinate input area, and a position P(u,v) where the reference axes of the two detectors are coordinate axes u,v, satisfies the following:

$$\tan\theta_1 = -v/(\sqrt{2}\times A + u), \tan\theta_2 = -v/(\sqrt{2}\times A + v),$$

and wherein a sensitivity (Gx,Gy) with respect to position P(x,y), which corresponds with placing the two detectors upon the calculated coordinates, is calculated by the following:

$$Gx = \sqrt{\{[\partial x/\partial(\tan\theta_1)]^2 + [\partial x/\partial(\tan\theta_2)]^2\}}$$

$$Gy = \sqrt{\{[\partial y/\partial(\tan\theta_1)]^2 + [\partial y/\partial(\tan\theta_2)]^2\}}$$

and said combined sensitivity is $G = \sqrt{(Gx^2 + Gy^2)}$.

* * * * *